March 14, 1967
PONG R. HSIA
3,308,509
EXTRUSION DIE
Filed June 1, 1965
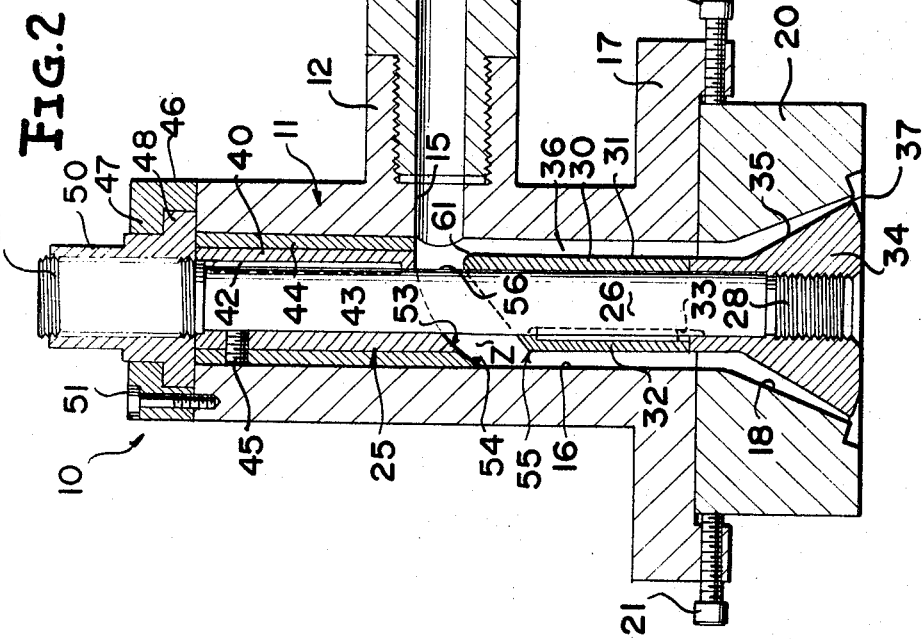
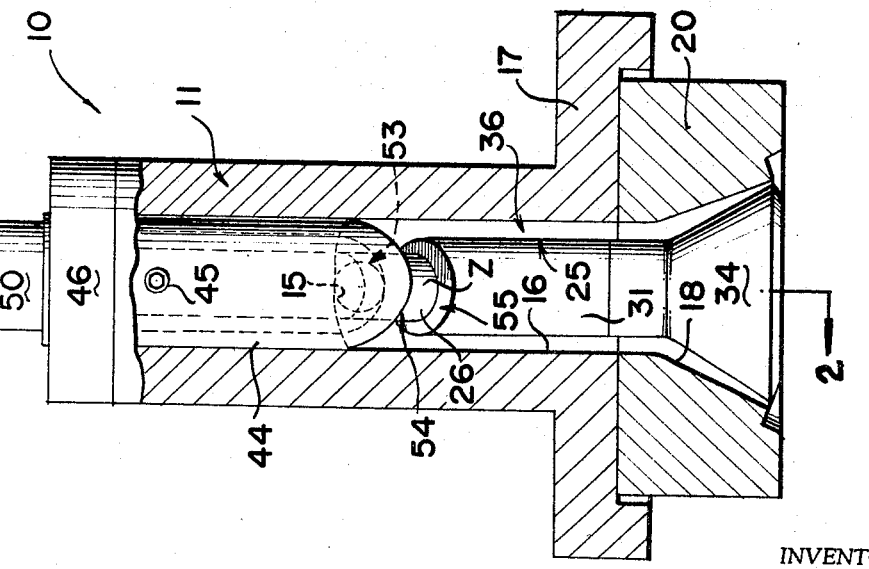
INVENTOR
PONG R. HSIA
BY *Hahn, Porter, Willer & Brown*
ATTORNEYS

United States Patent Office 3,308,509
Patented Mar. 14, 1967

3,308,509
EXTRUSION DIE
Pong R. Hsia, Chicago, Ill., assignor to Continental Can Company, Inc., New York, N.Y., a corporation of New York
Filed June 1, 1965, Ser. No. 460,426
11 Claims. (Cl. 18—14)

This invention relates to a novel extrusion die of the type generally employed in the manufacture of seamless plastic tubing, and is particularly directed to novel means for reunifying the plastic as it passes about or flows over a mandrel of the die which insures an even flow of the plastic through and outwardly of the die resulting in the formation of tubing which is constant in wall thickness and is of a uniform density throughout.

It is quite common in the manufacture of seamless plastic tubing to force polyethylene or other thermoplastic material through an extrusion die passage which is generally of an annular shape. The passage is defined by a mandrel located in a bore of the extrusion die. Hot plastic material is introduced into this passage and some portions thereof must necessarily flow over or about the mandrel and reunite or reknit downstream of the point of introduction. In such conventional extrusion dies reunification of the plastic material has not been achieved with the result that conventionally extruded plastic tubing is not uniform in wall thickness, density, etc., and includes other defects, such as very minor pin holes.

The present invention, however, provides a new improved extrusion die which is capable of producing seamless plastic tubing free of the above and other defects and disadvantages.

In accordance with this invention a mandrel positioned in a bore of an extrusion die body includes a pair of collars defining axially opposed spaced continuous flow-directing surfaces. The surfaces are so constructed and arranged that hot plastic material introduced into the extrusion die mandrel and united at a point diametrically opposite from and downstream to the point at which the material is introduced into the extrusion die. Because of the particular arrangement of the guide or flow-directing surfaces, the material is reunified into a homogeneous mass which flows evenly through the extrusion die resulting in the formation of tubing vastly superior to tubing produced in conventional extrusion dies.

It is, therefore, a prime object of this invention to provide a novel extrusion die of the type described, one of the flow-directing surfaces being generally uniplanar and angularly related to the path of travel of the plastic material through the extrusion die, and the other of the surfaces being in concavo-convex opposed relationship to the uniplanar surface.

Still another object of this invention is to provide a novel extrusion die of the type just described in which the uniplanar surface is of a predetermined constant width and the concavo-convex surface is of a gradually increasing width between the point at which the plastic material is introduced into the extrusion die and the point at which the divided plastic material is reunited.

With the above, and other objects in view that will hereinafter appear, the nature of the invention will be more clearly understood by reference to the following detailed description, the appended claims and the several views illustrated in the accompanying drawing.

In the drawing:

FIGURE 1 is a fragmentary elevational view partially in cross-section of a novel extrusion die constructed in accordance with this invention and illustrates a pair of collars carried in opposed spaced relationship by a shaft telescopically received in a bore of the extrusion die body.

FIGURE 2 is a fragmentary sectional view taken generally along line 2—2 of FIGURE 1, and illustrates axially opposed surfaces of the collars defining a generally annular channel which unifies plastic material at a point diametrically opposite to the point of introduction of the material into the extrusion die.

An extrusion die constructed in accordance with this invention is generally referred to by the reference numeral 10 and includes a die body 11 provided with a lateral boss 12 for attaching the extrusion die 10 to a conventional extruding machine (not shown). The connection between the extrusion die 10 and the extruding machine may be, for example, by a conduit 13 which is threadedly secured to the boss 12 by complementary threads (unnumbered). The conduit 13 includes a bore 14 coaxial with a bore 15 of the die body 11 opening into a larger longitudinal bore 16 which is generally cylindrical in outline.

The bore 16 opens outwardly through an end portion 17 thereof into a radially outwardly and downwardly flared bore 18 of a die head 20. The die head 20 is secured to the portion 17 of the die body 11 by a plurality of identical circumferentially arranged screws 21 in the manner clearly illustrated in FIGURE 2 of the drawing.

Mandrel means generally referred to by the reference numeral 25 is carried by the die body 11 of the extrusion die 10. The mandrel means or mandrel 25 extends longitudinally through the bores 16, 18 and includes a shaft 26 threaded at opposite end portions 27, 28. A bushing or collar 30 having a generally cylindrical exterior surface 31 is tightly secured to the shaft 26 by means of a key 32 and a keyway 33 (FIGURE 2). A conical head 34 is threadably secured to the threaded end portion 28 of the shaft 26 and has an exterior surface 35. The bores 16, 18 and the surfaces 31, 35 define a generally annular passage 36 for conducting hot flowable polymeric or plastic material outwardly of the extrusion die through a generally annular extrusion orifice 37 defined by the lowermost terminal portions of the surfaces 18, 35.

A bushing or collar 40 which is also of a generally cylindrical configuration in outline is tightly fixed to the shaft 26 by means of a key 42 and a keyway 43. The collar 40 is in turn surrounded by a collar or bushing 44. A radial set screw 45 retains the collars 40, 44 in assembled relationship, as is clearly illustrated in FIGURE 2 of the drawing.

The mandrel means 25 is secured to the die body 11 by means of a collar 46 having a radially inwardly directed flange 47 which overlies a radially outwardly directed flange 48 of a rotatable nut 50 threadedly receiving the threaded end portion 27 of the shaft 26. A plurality of fasteners 51 secure the collar 46 to the die body 11. Upon the removal of the fasteners 51 and the nut 50 the mandrel means 25 can be removed from the die body 11 in a downward direction, as is readily apparent from the drawing.

The bushings or collars 40, 44 include respective terminal surfaces 53, 54 in axially spaced opposed relationship to a terminal surface 55 of the collar or bushing 30. The surfaces 53, 54 are continuous, annular and surround an inetrmediate portion (unnumbered) of the shaft 26. The surfaces 53–55 and an intermediate exterior cylindrical surface portion 56 of the shaft 26 define a generally continuous annular channel which places the bore 15 in fluid communication with the passage 16. In addition, as pressurized plastic material is introduced into the die body 11 through the bore or port 15 a portion of the plastic material is divided and flows about the intermediate sufrace portion 56 toward a downstream area or zone diametrically opposite to the bore 15. At this latter zone the plastic material is reunified into a homogeneous mass and continues its movement through the passage 36 toward eventual extrusion at the extrusion orifice 37. The flow directing surfaces 53–55 are constructed to insure efficient reunification of the plastic material in the manner to be described immediately hereafter.

The flow directing surface 55 of the bushing or collar 30 is generally uniplanar and angularly related or inclined in relationship to the axis of the bore 16.

The surface 55 is also generally flat and of a substantially uniform width except for a curved portion 61 (FIGURE 2) adjacent and in convex opposed relationship to the bore 15.

The flow-directing surfaces 53, 54 are, on the other hand, curved to open in concave opposed relationship to the flow-directing surface 55, as is best illustrated in FIGURE 2 of the drawing. Due to this curved configuration of the flow-directing surfaces 53, 54 the widths thereof progressively increase from a minimum width adjacent the port 15 to a maximum width at a zone Z downstream of and diametrically opposite to the port 15. This construction of the flow-directing surfaces 53–55 permits a greater amount of the divided plastic material to reach the reunification zone Z than heretofore provided in conventional extrusion dies and consequently effects the production of an extruded tube, sheet or film which is of a generally uniform thickness and density. That is, the surfaces 53–55 act as a manifold to uniformly distribute the plastic material about the shaft 26, effect proper unification of the plastic material at the zone Z and introduce the plastic material uniformly into the passage 36 reuslting in the production of an extruded element possessing the desirable characteristics heretofore noted.

From the foregoing, it will be seen that a novel and advantageous structure has been disclosed for attaining the desired ends. However, attention is directed to the fact that variations may be made in this invention without departing from the spirit and scope thereof as defined in the appended claims.

I claim:

1. In an extrusion die of the type including a body having a bore which opens through an end portion of the body, a mandrel disposed longitudinally in said bore, a first portion of said mandrel at the end portion of the body being spaced from the wall of the bore to provide a plastic conducting passage, a second portion of said mandrel being axially spaced from the first portion to provide a continuous channel in communication with the plastic conducting passage, and means for introducing hot flowable plastic into said continuous channel at a predetermined point whereby the same is directed by the continuous channel into and through said conducting passage, the improvement comprising first and second flow-directing surfaces carried by said first and second mandrel portions respectively, said surfaces being continuous and in opposed relationship to each other, one of said surfaces being planar and angularly related to the axis of said bore, the other of said surfaces being curved, and a portion of said other surface concavely opening toward said one surface.

2. In an extrusion die of the type including a body having a bore which opens through a first end portion of the body, a mandrel disposed longitudinally in said bore, a first end portion of said mandrel at the first end portion of the body being spaced from the wall of the bore to provide a plastic conducting passage of a generally annular transverse cross-sectional configuration, a second portion of said mandrel being axially spaced from the first mandrel portion to provide a continuous channel of a generally annular transverse cross-sectional configuration in communication with the plastic conducting passage, and means for introducing hot flowable plastic into said continuous channel at a predetermined point whereby the same is directed by the continuous channel into and through said conducting passage, the improvement comprising first and second flow-directing surfaces defined by said first and second mandrel portions respectively, said surfaces being continuous and in opposed relationship to each other, one of said surfaces being generally uniplanar and angularly related to the axis of said bore, and the other of said surfaces being in concavo-convex opposed relationship to said uniplanar surface.

3. The improvement in an extrusion die as defined in claim 2 wherein said concavo-convex surface opens concavely toward said uniplanar surface, and said concavo-convex surface is of a gradually increasing width between said predetermined point adjacent said introducing means and another point remote from and generally diametrically opposed to said predetermined point.

4. The improvement in an extrusion die as defined in claim 2 wherein said generally uniplanar surface includes a surface portion adjacent said predetermined point in convex opposing relationship to said other surface.

5. The improvement in an extrusion die as defined in claim 2 wherein said concavo-convex surface opens concavely toward said uniplanar surface, said concavo-convex surface is of a gradually increasing width between said predetermined point adjacent said introducing means and another point remote from and generally diametrically opposed to said predetermined point, said generally uniplanar surface including a surface portion adjacent said predetermined point in convex opposing reltaionship to said other surface.

6. Apparatus for dividing and reuniting a fluid media comprising a housing, means in said housing and cooperative therewith to define a fluid media passage of a generally annular transverse cross-sectional configuration, axially opposed spaced surfaces defined by said means, said spaced surfaces partially defining a fluid media channel of a generally annular transverse cross-sectional configuration, said fluid media channel including an upstream portion and a downstream portion relative to said fluid media passage, means for introducing a fluid media into said channel at said upstream portion whereby division and reunification of the fluid media results during the passage thereof in said channel toward said downstream portion, one of said spaced surfaces being generally uniplanar and angularly related to the axis of said passage, the other of said spaced surfaces being concavo-convexly curved, and said other surface having a width which progressively increases between the upstream and downstream portions of said channel.

7. Apparatus for dividing and reuniting a fluid media comprising a housing, means in said housing and cooperative therewith to define a fluid media passage of a generally annular transverse cross-sectional configuration through which a fluid media is adapted to pass in a predetermined direction, axially opposed spaced surfaces defined by said means, another surface defined by said means located between said axially opposed surfaces and defining therewith a fluid media channel of a generally annular transverse cross-sectional configuration, said channel being in fluid communication with said passage, said channel having diametrically opposite upstream and downstream zones, means for introducing a fluid media into said housing adjacent said upstream zone whereby said opposed and another surfaces cooperatively divide the fluid media and thereafter reunify the fluid media at said downstream zone, one of said spaced surfaces being generally uniplanar and angularly related to the axis of said passage, the other of said spaced surfaces being curved in concave opposing relationship to said one surface, and said other surface having a width which increases between the upstream zone and the downstream zone.

8. In an extrusion die of the type including a body having a bore which opens through an end portion of the body, a mandrel disposed longitudinally in said bore, a first portion of said mandrel at the end portion of the body being spaced from the wall of the bore to provide a plastic conducting passage, a second portion of said mandrel being axially spaced from the first portion to provide a continuous channel in communication with the plastic conducting passage, and means for introducing hot flowable plastic into said continuous channel at a predetermined point whereby the same is directed by the continuous channel into and through said conducting passage, the improvement comprising first and second axially spaced and opposed flow-directing surfaces defined by said first and second mandrel portion respectively, said surfaces being generally annular in outline, said first surface being generally uniplanar, angularly related relative to the axis of said bore and of a generally uniform predetermined width, said second surface being curved to open concavely toward said first surface, and said second surface being of a predetermined width adjacent said introducing means and of a greater width toward a point diametrically opposite to said predetermined point.

9. An extrusion die comprising a die body, a bore in said body, a mandrel in said bore, said mandrel including a shaft carrying first and second axially spaced collars, said first collar having a peripheral surface spaced from a surface defining said bore and defining therewith a generally annular plastic conducting passage, said first and second collars having respective first and second axially spaced opposed continuous flow-directing surfaces, an exterior surface portion of said shaft and said flow-directing surfaces defining a continuous channel of a generally annular configuration, means for introducing hot flowable plastic into said die body adjacent a predetermined zone of said channel whereby at least some of the plastic is divided by the exterior surface portion of the shaft and directed by the flow-directing surfaces toward a zone diametrically opposite said predetermined zone at which zone reunification of the plastic takes place, said first surface being generally uniplanar, said second surface being concavo-convex in configuration, and said channel being angularly related to the mandrel axis with the predetermined zone being upstream from the reunification zone.

10. An extrusion die comprising a die body, a bore in said body, a mandrel in said bore, said mandrel including a shaft carrying first and second axially spaced collars, said first collar having a peripheral surface spaced from a surface defining said bore and defining therewith a generally annular plastic conducting passage, said first and second collars having respective first and second axially spaced opposed continuous flow-directing surfaces, an exterior surface portion of said shaft and said flow-directing surfaces defining a continuous channel of a generally annular configuration, means for introducing hot flowable plastic into said die body adjacent a predetermined zone of said channel whereby at least some of the plastic is divided by the exterior surface portion of the shaft and directed by the flow-directing surfaces toward a zone diametrically opposite said predetermined zone at which zone reunification of the plastic takes place, and said first surface being generally uniplanar, said second surface being concavo-convex in configuration, and said channel being anglarly related to the mandrel axis with the predetermined zone being upstream from the reunification zone, said first surface being of a generally uniform constant width, and said second surface being of a progressively increasing width between said predetermined zone and said reunification zone.

11. The extrusion die as defined in claim 9 including a spacing collar surrounding said second collar, and said spacing collar including a axial surface complementing said second surface.

References Cited by the Examiner

UNITED STATES PATENTS

| | | | |
|---|---|---|---|
| 2,025,666 | 12/1935 | Hanff. | |
| 2,511,986 | 6/1950 | Martin | 18—13 |
| 2,560,778 | 7/1951 | Richardson et al. | 18—13 |
| 2,794,213 | 6/1957 | Davis | 18—13 |
| 2,963,740 | 12/1960 | Earl Yim | 18—13 |

FOREIGN PATENTS 218,292   11/1958   Australia.

WILLIAM J. STEPHENSON, *Primary Examiner.*